(12) United States Patent
Aberle et al.

(10) Patent No.: US 6,518,544 B2
(45) Date of Patent: Feb. 11, 2003

(54) METHOD FOR MATERIAL MACHINING BY WAY OF LASER

(75) Inventors: Hanns-Dieter Aberle, Ennepetal (DE); Dino Paganelli, Saint Alban de Montbel (FR)

(73) Assignees: Alltec Angewandte Laser Licht Technologie GmbH, Luebeck (DE); Foba GmbH Elektronik +Lasersysteme, Luedenscheid (DE)

( * ) Notice: Subject to any disclaimer, the term of this patent is extended or adjusted under 35 U.S.C. 154(b) by 0 days.

(21) Appl. No.: 09/902,391

(22) Filed: Jul. 10, 2001

(65) Prior Publication Data

US 2002/0043522 A1 Apr. 18, 2002

(30) Foreign Application Priority Data

Jul. 10, 2000 (DE) .......................................... 100 32 981

(51) Int. Cl.[7] ........................... B23K 26/02; B23K 26/08
(52) U.S. Cl. ............................ 219/121.78; 219/121.83; 219/121.85
(58) Field of Search ..................... 219/121.78, 121.79, 219/121.81, 121.82, 121.83, 121.85

(56) References Cited

U.S. PATENT DOCUMENTS

| | | | | |
|---|---|---|---|---|
| 4,734,550 A | * | 3/1988 | Imamura et al. | 219/121 LT |
| RE33,947 E | * | 6/1992 | Shinohara | 156/643 |
| 5,284,792 A | * | 2/1994 | Forster et al. | 437/129 |
| 6,300,593 B1 | * | 10/2001 | Powell | 219/121.68 |
| 6,436,553 B1 | * | 8/2002 | Stadler et al. | 428/600 |

FOREIGN PATENT DOCUMENTS

DE     42 09 933     9/1993

* cited by examiner

*Primary Examiner*—M. Alexandra Elve
(74) *Attorney, Agent, or Firm*—Cohen, Pontani, Lieberman & Pavane

(57) ABSTRACT

A laser beam is led in tracks over a section of a surface to be machined, whereupon the surface is moved in order to bring a neighboring section into the machining field of the laser over which the laser beam is then again led in tracks. At the borders of neighboring sections there is formed an overlapping region, whose machining is allocated to the one or the other section such that the tracks in which the laser beam is guided on the respective section intermesh in the overlapping region.

3 Claims, 2 Drawing Sheets

METHOD FOR MATERIAL MACHINING BY WAY OF LASER

BACKGROUND OF THE INVENTION

1. Field of the Invention

The invention relates to a method for material machining by way of laser, in particular for laser engraving with which the laser beam in tracks is led over a section of a surface of a subject to be machined, whereupon the subject is moved in order to bring a neighboring section of the subject into the machining field of the laser, over which then the laser beam is again led in tracks.

2. Description of the Related Art

With the two-dimensional laser micromaterial machining of subjects according to the state of the art, such as for example is known from DE 42 09 933, the tracks of the laser beam at neighboring sections meet or contact on a separating line when a field must be machined which is greater than the machining field of the used scanner head. At the resulting separating and bordering lines with the overlapping of the laser impulses with the machining of the individual regions there occurs an increased material removal, and with a contact or insufficient overlapping a reduced material removal. In both cases the separating lines between the individual regions become clearly visible which is generally not desired. In the case of three-dimensional engraving as a rule the volume to be taken away is removed is layers, wherein the above described effect is amplified even further. FIG. 1 shows the above described state of the art.

SUMMARY OF THE INVENTION

The object of the invention lies in improving the initially mentioned method so that no separating lines or transition regions are visible at the bordering regions of a field of a subject to be engraved.

The solution of this object lies in a method for material machining, in particular laser engraving, in which the laser beam is guided in tracks over a section of a surface of a subject to be machined, whereupon the subject is moved such that a neighboring section of the subject comes into the machining field of the laser over which the laser beam is then guided again in tracks. At the borders of neighboring sections of the subject there is formed an overlapping region whose machining is allocated to the one or to the other section such that the tracks in which the laser beam is guided on the respective section intermesh in the overlapping region.

With a two-dimensional machining, i.e. only a single layer is removed, the surface to be machined is divided into several sections in the form of a grid. With a focal width of the scanner of approx. 100 mm the section to be engraved has a size of approx. 70×70 mm$^2$. In order to avoid the problem of the recognizable sharp separating or border line, on joining together the bordering regions according to the invention there is formed an overlapping region which on both sides of the common section border concerned is wider than the laser track.

The individual tracks of the laser machining end within this overlapping region and not on the common border line of the sections; the system or the device for carrying out the method according to the invention however notices where the individual machining track ends in order to connect thereto in the next section in a "seamless" manner. In this way there no longer occurs any optically recognizable transition line but within the overlapping region a non-uniform distribution of transition points which in the overlapping region preferably are completely statistically distributed, wherein the distribution may also be fixed by the user of the machining means. As long as the transition points are distributed in a sufficiently unordered manner, they are no longer perceived as an optical defect and are thus no longer recognizable as a separating or border line.

In order in the case of three-dimensional machining to avoid a disadvantageous effect of layers applied over one another, a section is not completely machined, i.e. the removal volume is not removed in the whole depth but in the whole machining field in layers, i.e. in all sections the material is first removed from a first layer and thus all transitions of the first layer created. Thereafter a second layer is machined or removed, and specifically the direction of the parallel laser tracks of the second layer is rotated by any angle to the laser tracks of the first layers so that there does not occur any systematic excesses of the deepening. Just as with the described one-layer machining the transition points of the second and further layers of each section also lie in an overlapping region either distributed about the same, or also a displaced or rotated section border. In this way one removes layer for layer without the transition regions becoming visible.

If the number of layers is large enough it is also sufficient to provide overlapping regions in a few of the last layers to be removed in the manner according to the invention, whilst border regions in the first layers may joined to one another in a conventional manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
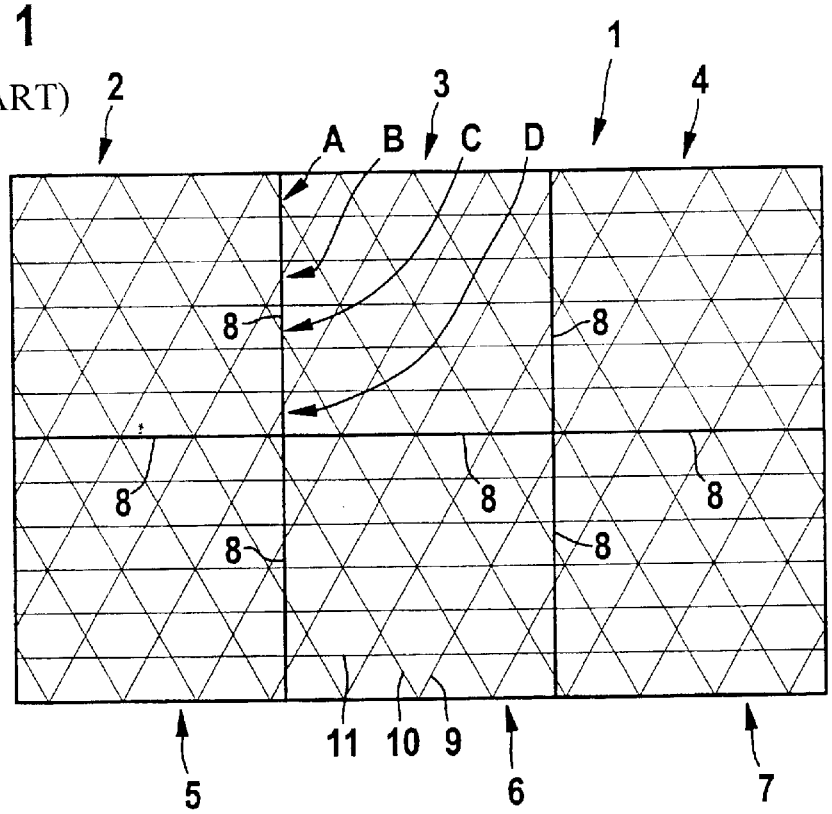
FIG. 1 illustrates an engraving procedure according to the prior art.

FIG. 1 shows a surface of a subject to be engraved in three layers using a laser. The surface of the subject to be machined is subdivided into six machining sections 2 to 7, each section corresponding to the machining field of the used, known laser head. The borders of sections neighboring one another are indicated at 8. The middle of the individual machining tracks of the laser beam of the scanner head are represented schematically as lines 9, 10 and 11. On engraving, the scanner head moves along these lines running at any angle to one another. The individual machining tracks 9, 10 and 11 are thus mutually displaced in order to avoid systematic excesses of the deepenings in the sections. The end points A, B, C and D of the machining tracks lie in each case on the common borders 8 of the individual sections 2 to 7 so that here there are formed transition points which lie on a line formed by the borders 8. Since the machining is effected in sections, i.e. for example firstly the section 2 is machined, whereupon the subject or the laser head is accordingly displaced and then the section 3 is machined, there arises this transition point indicated in FIG. 1 at A, B, C and D. Here it is not the case of points in the actual sense but of transition points of the individual tracks which are distinguished by the tracks of neighboring sections for example being slightly displaced to one another, the material removal in this region being slightly increased or reduced. These transition points after the engraving procedure form an optically visible border line which has a disturbing effect.

Figure 2:
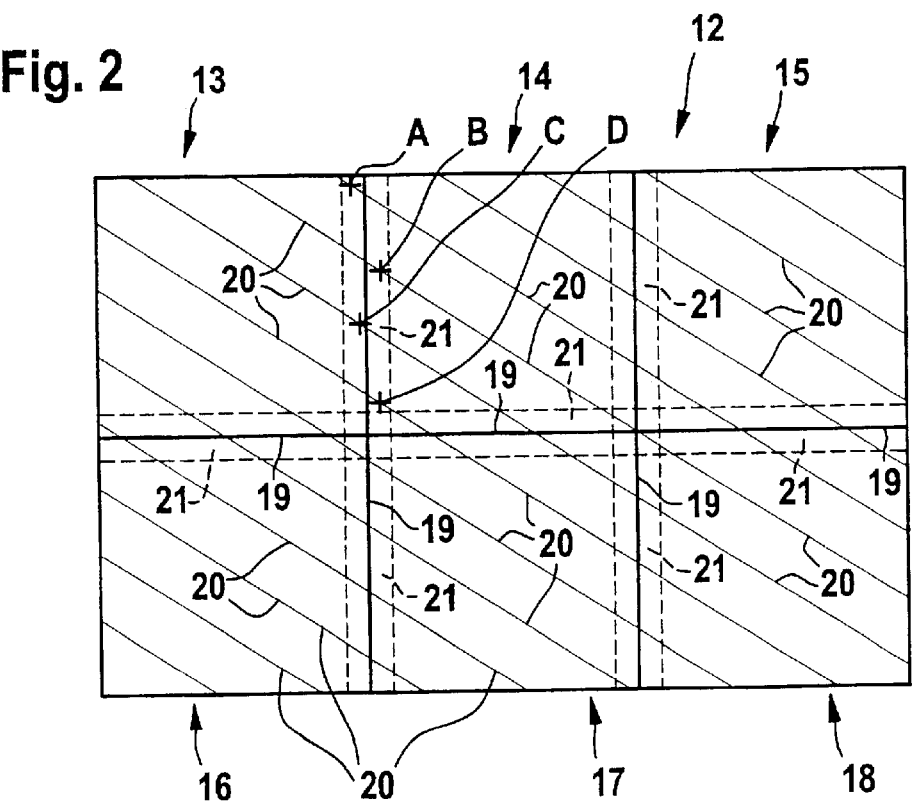
FIG. 2 illustrates an engraving procedure according to the invention for a one-layer engraving.

FIG. 2 shows a machined surface 12 of a subject which likewise is subdivided into six machining sections 13 to 18 which meet one another at border lines 19. In this example of a one-layer engraving, the middle of the machining laser moves on tracks 20 shown schematically as oblique lines. Between the sections 13 to 18 bordering one another in each case there is formed an overlapping region 21. For the laser machining of these sections the overlapping regions 21 are allocated to these sections such that the tracks 20 along which the laser beam is led on the respective section lead into the respective overlapping region and intermesh or meet one another. This is for example indicated in an overlapping region 21 with the crosses A, B, C and D which represent the end points of the individual machining tracks in each section. One recognizes that the end points concerned of the machining tracks as a rule do not lie on the border line 19 concerned, but are located uniformly distributed in the overlapping region concerned. This distribution of the points A, B, C and D is given in all overlapping regions. By way of this distribution of the end points of the machining tracks it results that a border line between the individual sections 13 to 18 bordering one another is no longer visible.

Figure 3:
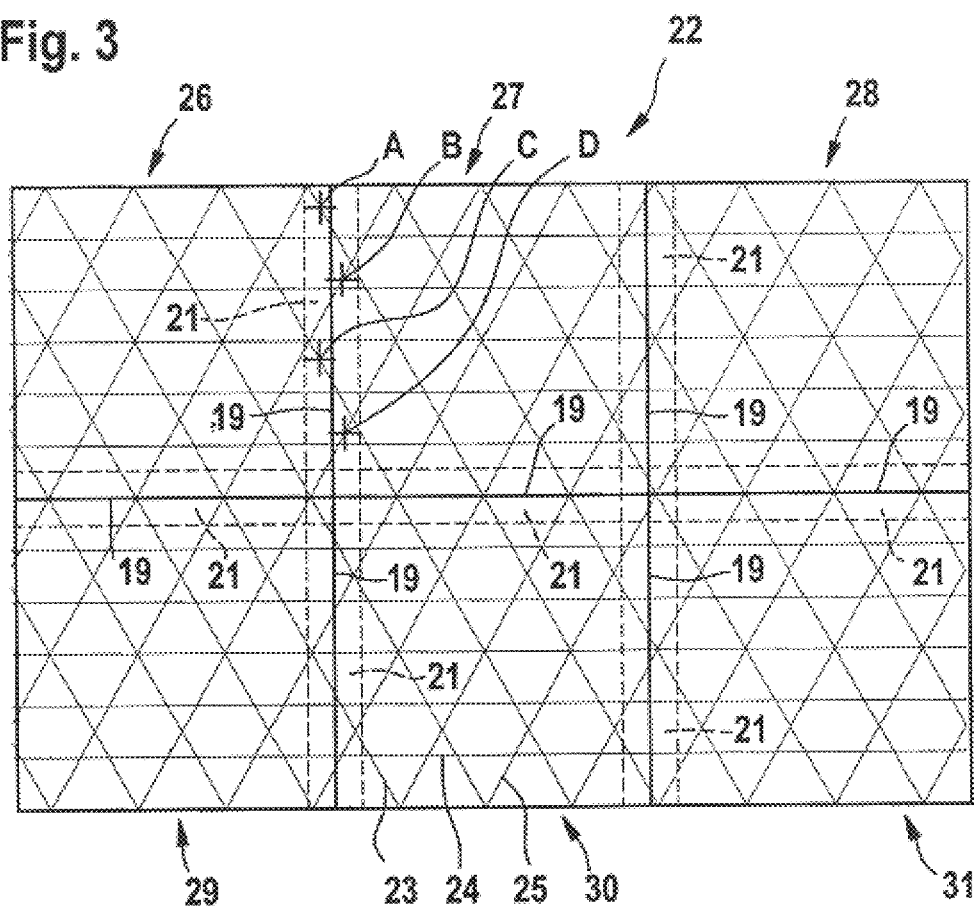
FIG. 3 illustrates an engraving procedure according to the invention for a multi-layer engraving.

The representation according to FIG. 3 corresponds essentially to that in FIG. 2. The only difference is that with the machining field 22, three engraved layers lie over one another, thus there is present a three-dimensional laser machining. Additionally to the first machining tracks 23 for the shown machining field 22 there are provided further machining tracks 24, 25, wherein the machining tracks of various layers are angularly displaced to one another. In this case too there are provided overlapping regions 21 of sections 26 to 31 bordering one another, in which the end points of the machining tracks of the laser heads are irregularly distributed.

The machining according to FIG. 3 is effected in a manner such that firstly for example in section 26 there is effected a material removal along the tracks 23, wherein the tracks 23 irregularly end in the transition regions 21. Subsequently the subject or the laser head is displaced in order to machine the section, wherein the machining in the transition region begins at the points A and C so that as a whole there results a uniform machining also in this transition region, only the transition points in this region lie distributed. When the whole subject has been machined in this manner there is effected a machining along the tracks 25 as well as then along the tracks 24 or vice-versa. There is this not effected, as is the case with the state of the art, a complete machining of the respective section 26 to 31, but firstly the machining of all the sections in one layer, whereupon the removal of the layer lying thereunder is again effected in sections. By way of the fact the tracks of layers lying over one another or under one another are arranged displaced to one another, preferably angularly displaced, and that with the layered machining there are provided overlapping regions 21 with the two-dimensional as well as with the three-dimensional machining shown here, there results an optically homogeneous machining result without visible transitions between the transition sections.

Figure 4:
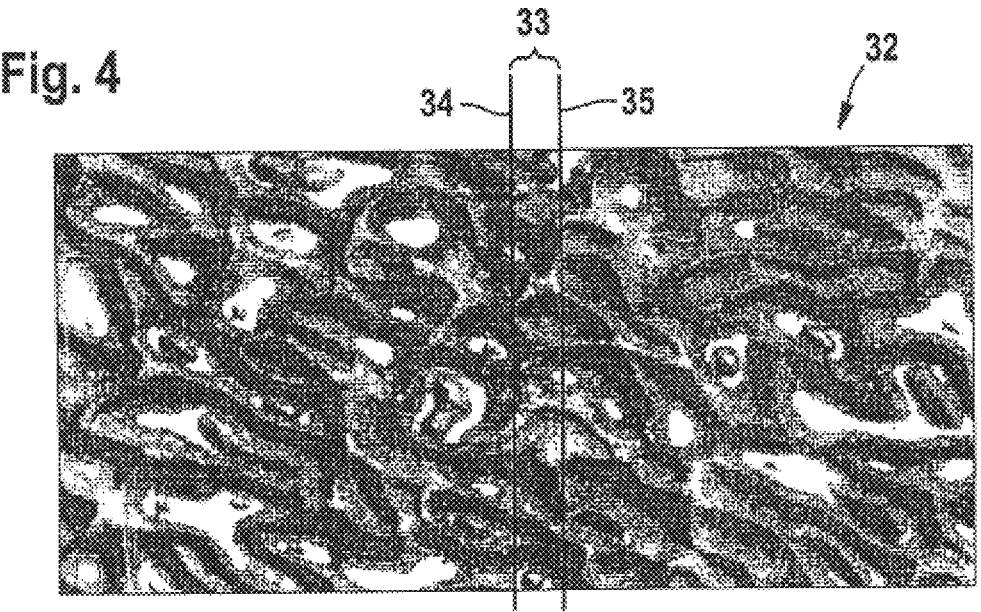
FIG. 4 is an enlarged representation section of a machined surface of a subject.

FIG. 4 shows a cut-out 32 of a machined surface of a subject in an enlarged representation. The machined surface cut-out 32 shows in its transition region 33 between the lines 34 and 35 that there are not recognizable any end points or transition points of the machining tracks of the scanner head of two sections of an engraved subject which border one another and are machined by way of a laser beam.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of material machining of a subject by way of a laser having a machining field, said subject having a surface which is divided into neighboring sections having common borders and overlapping regions which extend on both sides of each said border, said method comprising positioning one of said sections of said surface in said machining field of said laser, guiding the laser beam in tracks over said one of said sections, each said track ending in an overlapping region at a transition point in one of said one of said sections and a neighboring section, moving the subject in order to bring said neighboring section of the surface into the machining field of the laser, and guiding the laser beam in tracks over the neighboring section, each said track ending in said overlapping region at a common transition point with one of said tracks of said one of said sections, said transition points being distributed throughout the overlapping region.

2. A method of material machining as in claim 1 wherein said subject is machined in several layers, a first said layer being machined by guiding the laser beam over several neighboring sections, a second said layer being machined by guiding said laser over said several neighboring sections.

3. A method of material machining as in claim 2 wherein each said layer is machined by guiding said laser beam in tracks which are angularly displaced with respect to tracks used to machine other ones of said layers.

* * * * *